(12) United States Patent
Viswanadha et al.

(10) Patent No.: US 7,882,492 B2
(45) Date of Patent: Feb. 1, 2011

(54) INTELLIGENT COMPUTER PROGRAM DEBUGGER, AND SYSTEM AND METHOD FOR IMPLEMENTING THE SAME

(75) Inventors: Sreenivasa R. Viswanadha, Cupertino, CA (US); Prakash Narayan, Fremont, CA (US)

(73) Assignee: Oracle America, Inc., Redwood City, CA (US)

( * ) Notice: Subject to any disclaimer, the term of this patent is extended or adjusted under 35 U.S.C. 154(b) by 1896 days.

(21) Appl. No.: 10/943,528

(22) Filed: Sep. 17, 2004

(65) Prior Publication Data

US 2009/0210862 A1    Aug. 20, 2009

(51) Int. Cl.
*G06F 9/44* (2006.01)

(52) U.S. Cl. .................. 717/124; 717/127; 717/128; 717/129

(58) Field of Classification Search .................. 717/124
See application file for complete search history.

(56) References Cited

U.S. PATENT DOCUMENTS

| | | | |
|---|---|---|---|
| 6,003,143 A | | 12/1999 | Kim et al. |
| 6,282,701 B1 | | 8/2001 | Wygodny et al. |
| 6,427,232 B1 * | 7/2002 | Ku et al. .................. 717/124 |
| 7,111,281 B2 * | 9/2006 | Bates et al. .................. 717/129 |
| 7,401,323 B2 * | 7/2008 | Stall et al. .................... 717/130 |
| 2002/0129337 A1 | 9/2002 | Evans et al. |
| 2003/0079159 A1 * | 4/2003 | Ten-Hove et al. ............. 714/34 |
| 2003/0149961 A1 * | 8/2003 | Kawai et al. ................ 717/129 |
| 2004/0117769 A1 * | 6/2004 | Lauzon et al. ............... 717/125 |

FOREIGN PATENT DOCUMENTS

EP    0 730 227    9/1996

* cited by examiner

*Primary Examiner*—Thomas K Pham
(74) *Attorney, Agent, or Firm*—Martine Penilla & Gencarella, LLP

(57) ABSTRACT

A method for displaying a user-defined artifact in a debugger view is provided. The user-defined artifact is defined in a software application that is developed by a computer software application developer. The software application is included in a packaged application that includes instructions, with each instruction being either a user-defined instruction or a non-user defined instruction. A breakpoint is defined at a desired instruction of the packaged application. The method includes initiating debugging of the packaged application and hitting the breakpoint defined at the desired instruction. Also included is identifying the user-defined artifact in the software application and obtaining data to populate the debugger view. Further included is filtering-in data associated with the user-defined artifact and displaying the debugger view showing the filtered-in data. The method also includes marking data not associated with the user-defined artifact and stepping through the user-defined instruction.

20 Claims, 9 Drawing Sheets

INTELLIGENT COMPUTER PROGRAM DEBUGGER, AND SYSTEM AND METHOD FOR IMPLEMENTING THE SAME

BACKGROUND OF THE INVENTION

1. Field of the Invention

This invention relates generally to debugging computer programs, and more particularly, to systems and methods for simplifying and improving debugging of program code associated with developer-written computer program.

2. Description of the Related Art

As software applications (herein also referred to as applications) have become more and more complex, so has the process of debugging the applications. Currently, debugging an application involves traversing the entire execution path, so that any existing bugs (e.g., an error or defect) can be detected, identified, and eliminated. The execution path, however, includes computer program code written by the developer (herein also referred to as user) as well as computer system program executing the application and code generated by the computer system executing the application. Of course, the developer is merely interested in discovering and eliminating any existing bugs in the developer written application. Nonetheless, the user has to also debug system program code and tool-generated computer program code, which is unnecessary, a waste of developer's valuable time as well as computing power.

For instance, debugging a J2EE application using a Java debugger involves treating the J2EE application, code generated by tools (e.g., EJB compiler, JSP compiler etc.), and the application server configured to run the J2EE application, as a single Java program. It must be noted, however, that a significant portion of the single J2EE application program computer program code (hereinafter also referred to as the code) includes the application server code and tool-generated code, while only a small portion of the single Java program code is associated with the J2EE application code being debugged.

Defining a break point at a desired line of the single Java program code can facilitate debugging the single Java program. By way of example, the state of the single Java code at the break point can be displayed by the debugger using different debugger views (e.g., call stack view, a variable view, a thread view, etc.). However, the call stack includes the user-written code as well as the system computer program code and/or tool-generated computer program code. In the same manner, the variable view displays values of system generated variables, tool-generated variables, and developer-written variables while the thread view displays the threads in the developer-written code, system generated threads, and all threads generated by all the other applications running on the application server. As such, to monitor debugging of the J2EE application using any of the stack view, variable view, and thread view, the developer has to traverse each and every displayed stack, variable, and thread, so as to locate the bug, if any. Of course, examining each stack, variable, and thread is a tedious and time-consuming job, which unnecessarily wastes the developer's valuable time.

A debugging activity can also involve the stepping operation wherein each line of the single Java code is executed, one at a time, and the state of the application is displayed as each line of code is executed. The stepping operation can take control of system program code or tool-generated program code. As a result, the user has to go through several steps before the user reaches the next logical step in the user's application program code. During the stepping operation, the debugger views show state of the variables and methods as the debugger steps through each system code, tool-generated code, and user-written code, wasting the developer's valuable time.

In view of the foregoing, a need therefore exists in the art for an efficient computer program debugger capable of focusing the debugging operation on program code associated with a desired software application while bypassing non-associated program code.

SUMMARY OF THE INVENTION

Broadly speaking, the present invention fills this need by providing a debugger capable of focusing debugging operations on computer program code of a computer software application developed by a software developer. In one embodiment, developer-written artifacts are filtered-in, thus displaying data associated with the filtered-in developer-written artifacts in a debugger view, while non-user defined artifacts are collapsed and marked, in accordance with one embodiment of the present invention. It should be appreciated that the present invention can be implemented in numerous ways, including as a process, an apparatus, a system, a device, or a method. Several inventive embodiments of the present invention are described below.

In one embodiment, a method for displaying a user-defined artifact in a debugger view is provided. The user-defined artifact is defined in a software application that is developed by a computer software application developer. The software application is included in a packaged application that includes instructions, with each instruction being either a user-defined instruction or a non-user defined instruction. A breakpoint is defined at a desired instruction of the packaged application. The method includes initiating debugging of the packaged application and hitting the breakpoint defined at the desired instruction. Also included is identifying the user-defined artifact in the software application and obtaining data to populate the debugger view. Further included is filtering-in data associated with the user-defined artifact and displaying the debugger view showing the filtered-in data. The method also includes marking data not associated with the user-defined artifact and stepping through the user-defined instruction.

In another embodiment, a method for debugging a packaged software application that includes instructions each of which can be either a user-defined instruction or a non-user-defined instruction is provided. The user-defined instruction is contained in a software application developed by a software application developer. A breakpoint is defined at a desired instruction of the packaged software application. The method includes initiating debugging of the packaged software application and hitting the breakpoint defined at the desired instruction. The method also includes identifying a user-defined artifact in the software application wherein the user-defined artifact is developed by the developer in the software application. The method also includes filtering-in an instruction referring to the user-defined artifact and marking an instruction not referring to the user-defined artifact. Also included is stepping through the instruction referring to the user-defined artifact and displaying data associated with the filtered-in instruction referring to the user-defined artifact.

In yet another embodiment, a computer program embodied on a computer readable medium for displaying a user-defined artifact in a debugger view is provided. The user-defined artifact is defined in a software application that is developed by a computer software application developer. The software application is included in a packaged application that includes instructions with each instruction being either a user-defined instruction or a non-user defined instruction. A breakpoint is defined at a desired instruction of the packaged application. The computer program includes program instruction for initiating debugging of the packaged application and hitting the breakpoint defined at the desired instruction. Also included are program instructions for identifying the user-defined artifact in the software application and obtaining data to populate the debugger view. Further included are program instructions for filtering-in data associated with the user-defined artifact and displaying the debugger view showing the filtered-in data. The computer program also includes program instruction for marking data not associated with the user-defined artifact and stepping through the user-defined instruction.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1A:
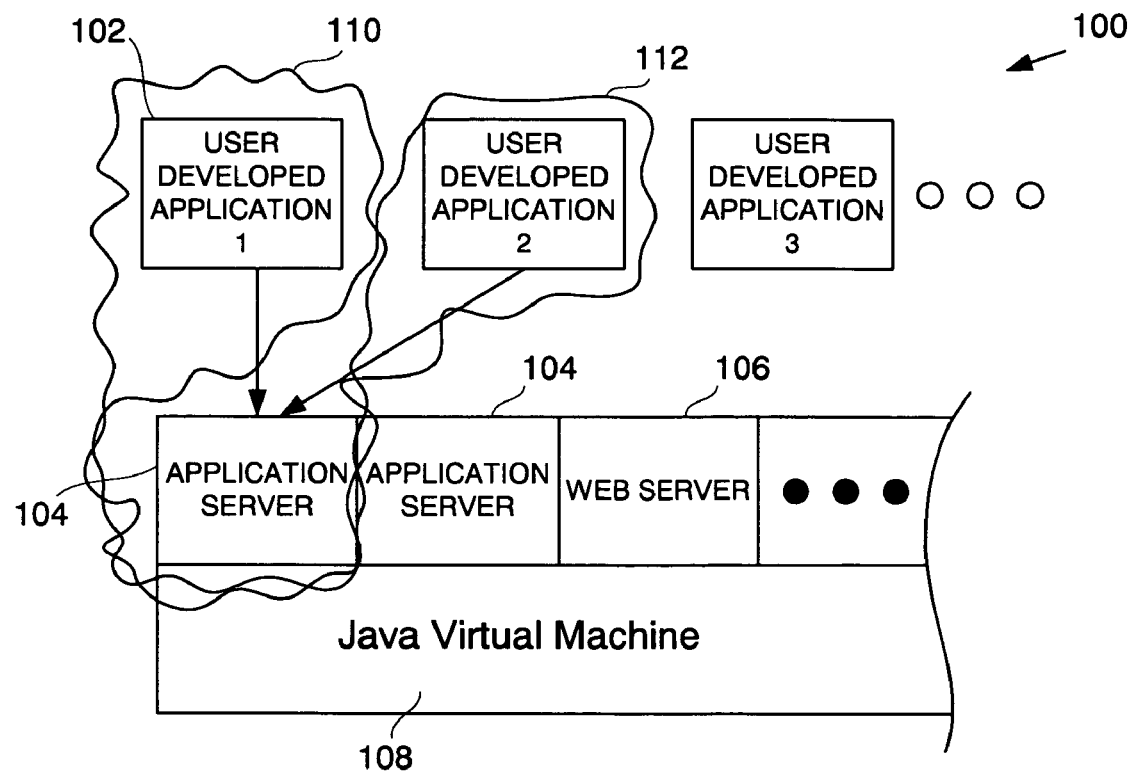
FIG. 1A is a simplified block diagram of an exemplary user-developed application being debugged by a debugger of the present invention, in accordance with one embodiment of the present invention.

Inventions for a debugger capable of focusing debugging operations on computer program code of a computer software application developed by a software developer are provided. The debugger filters in user-defined artifacts and/or user-defined program code and non-user defined program code referring to user-defined artifacts, while skipping over non-user defined artifacts or non-user-defined computer program code not referring to user-defined artifacts. As used herein, an artifact refers to declared and runtime types and values of data variables in a computer software application, method call sequences (i.e., the call-stack), threads in the application, classes loaded, methods and fields of the classes, source code for the application, etc.). Also provided are system and methods for implementing the debugger. Several exemplary embodiments of the invention will now be described in detail with reference to the accompanying drawings.

The embodiments of the present invention provide a debugger and methods and system for implementing the same wherein the debugger has the capability to focus on debugging computer program code (herein also referred to as code) of a computer software application (hereinafter also referred to as application) written by a developer (herein also referred to as user, interchangeably). In one embodiment, the debugger of the present invention discovers and identifies artifacts associated with developer-written code by parsing the developer-written program. Using the identified artifacts, the debugger filters in data associated with developer-written artifacts. In one example, data associated with each artifact can be displayed as the debugger steps through developer-written code referring to the developer-written artifacts. In one embodiment, the debugger of the present invention can further cloak the non-developer-written artifacts (e.g., system program code, tool-generated program code, etc.). In another implementation, the debugger of the present invention can further collapse non-developer written artifacts and non-developer-written program code that do not refer to the developer-written artifacts.

In one exemplary embodiment, the debugger of the present invention is a Java™ 2 Enterprise Edition (J2EE) debugger capable of debugging Enterprise applications. The J2EE debugger of the present invention extends a Java debugger by filtering-in developer-written artifacts and displaying data associated with the filtered-in artifacts corresponding to a selected debugger view (e.g., call stack view, variable view, and thread view, etc.) as the debugger steps through developer-written program code. In this manner, the J2EE debugger displays data associated with the Enterprise program code and collapses application server and tool-generated code, variables, and threads, etc.

In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

I. Environment Description

As embodiments of the present invention can implement Enterprise Java Beans (EJB) in Java™ 2 Enterprise Edition (J2EE) platform, below are brief introduction to the J2EE platform and EJB architectures are provided below. The J2EE, developed by Sun Microsystems, Inc., is an industrystandard development and deployment environment for Enterprise software applications capable of running on a variety of desktop computers, servers, and other computing devices. J2EE provides architecture for developing, deploying, and executing applications in a distributed-object environment. In one embodiment, the J2EE platform comprises the Java 2 Software Development Kit, Standard Edition (SDK), and Java Runtime Environment (JRE), EJB container, and a Web container.

J2EE facilitates building Web-based applications. Broadly speaking, J2EE services are performed in the middle tier between the user browser and the databases and legacy information systems. J2EE comprises a specification, reference implementation, and a set of testing suites. J2EE further comprises Enterprise JavaBeans (EJB), Java Server Pages (JSP), Java servlets, and a plurality of interfaces for linking to information resources in the platform.

The J2EE specifications define how applications should be written for the J2EE environment. Thus the specifications provide the contract between the applications and the J2EE platform. However, there exist a class of Java applications that require customization of the J2EE platform. These applications generally utilize application specific strategies created by a particular vendor to accomplish specific tasks that are not provided by the general Java platform on which the application executes. Examples of this class of Java applications include telecommunications applications and services that are deployed within a particular service provider's environment. This class of applications typically requires continuous availability, which means the environment in which the applications operate requires the applications to be available most of the time.

Summarily, EJB architecture promotes the creation of re-usable server-side behaviors or instructions in the Java language, connectors to enable access to existing Enterprise systems, and easy-to-deploy program modules. The EJB architecture creates a collaborative architecture to provide services virtually anywhere, and for a wide range of customers and devices, including mobile devices.

The EJB architecture defines a model for the development and deployment of reusable Java server components called EJB components (i.e., EJB beans). As designed, the EJB component is a non-visible server component having methods that provide business logic in a distributed application. In one example, the EJB architecture includes the EJB client and the EJB server. The EJB client is configured to provide the user-interface logic on a client machine and to make calls to remote EJB components on a server. For instance, the EJB client is provided the information as to how to find the EJB server and how to interact with the EJB components.

In one example, the EJB client does not communicate directly with the EJB component. In one aspect, the EJB container provides the client proxy objects that implement the home and remote interfaces of the component. In another instance, the remote interface is configured to define the business methods that can be called by the client. In another embodiment, the client is configured to invoke the methods resulting in the updating of the database. Thus, the EJB beans are reusable components that can be accessed by client programs. The application programmer codes the business logic into the EJBs and deploys them into a J2EE compliant server. In one example, the server complying with the J2EE specification provides the required system-level services, thus allowing the application programmer to concentrate on business logic.

The EJB server includes an EJB container, which in one example provides the services required by the EJB component. For instance, the EJB container may be configured to include one of an EJB home interface or EJB Remote interface and EJB beans. In one embodiment, the EJB home interface and the EJB remote interface are defined in the same Java virtual machine. In a different embodiment, the EJB home interface and the EJB remote interface may be defined on different Java virtual machines or separate physical computers.

In one example, the EJB specification defines a container as the environment in which one or more EJB components can be executed. In accordance to one example, the EJB container provides the infrastructure required to run distributed components thus allowing the clients and component developers to focus on programming business logic. Simply stated, the container manages the low-level communications between the clients and the EJB beans. In one example, once an EJB bean is created by a client, the client invokes methods on the EJB bean as if the EJB bean were running in the same virtual machine as the client.

Furthermore, the clients are unaware of activities on the EJB bean, since the container is configured to sit between the clients and the EJB beans. For instance, if an EJB bean is passivated, its remote reference on the client remains intact. Thus, when the client later invokes a method on the remote reference, the container activates the EJB bean to service the request.

The EJB container encapsulates:

The client runtime and generated sub classes. In one example, this allows the client to execute components on a remote server as if the components were local objects.

The naming service allows the clients to instantiate components by name. It further allows components to obtain resources (e.g., database connections, etc.) by name.

The EJB server component dispatcher, which in one example, executes the component's implementation class and provides services such as transaction management, database connection pooling, and instance lifecycle management.

In one example, three types of EJB components can be enumerated.

Stateful session Beans: A stateful session bean manages complex processes or tasks that require the accumulation of data. They further manage tasks that require more than one method call to complete but are relatively short lived, store session state information in class instance data, and have an affinity between each instance and one client from the time the client creates the instance until it is destroyed by the client or by the server.

Stateless session Beans: A stateless session bean manages tasks that do not require the keeping of client session data between method calls. Furthermore, the method invocation by a stateless session bean does not depend on data stored by previous method invocations, there is no affinity between a component instance and a particular client, and different instances of the stateless session beans are seemed identical to the client.

Entity Beans: An entity bean model is a business model that is a real-world object which methods are run on the server machine. When the entity bean method is called, the program's thread stops executing and control is passed to the server. When the method returns from the server, the local thread resumes executing. In one example, the entity beans have the following characteristics: Each instance represents a row in a persistent database relation (e.g., a table, view, etc.); and The bean has a primary key that corresponds to the database relation's key which is represented by a Java data type or class.

Each EJB component further has a transaction attribute configured to determine the manner the instances of the component participate in transactions. As designed, the EJB container provides services which can include transaction and persistence support to the EJB components. As to the transaction support, the EJB container is configured to support transactions. In one example, when the bean is deployed, the EJB container provides the necessary transaction support. In regard to the persistence support, the EJB container is configured to provide support for persistence of the EJB components, which in one embodiment, is defined as the capability of the EJB component to save and retrieve its state. In this manner, the EJB component does not have to be re-created with each use.

In one example, the EJB architecture is a three-tiered architecture in which the clients reside on the first tier, the application server and the components (i.e., EJB beans) reside on the second tier, and the databases reside on the same host as the EJB server. In accordance to one implementation, the EJB server executes methods on a component from the client or another component, retrieves data from databases, and performs other communications. The EJB server further handles the details of transactions, threads, security, database connections, and network communication. Summarily, the EJB clients request business-logic services from EJB beans running on the second-tier. The EJB beans then use the system services provided by the second-tier server to access data from existing systems in the third tier. The EJB beans apply the business rules to the data, and return the results to the clients in the first-tier.

In one example, the client contains the user interface. The business logic is configured to be separate from both the clients and the databases and resides in the same tier (i.e., second tier) as components that analyze data, perform computations, or retrieve information from data sources and processes.

As J2EE and EJBs use the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium, and large, without modification. Developed by Sun, Java has been promoted and geared heavily for the Web, both for public Web sites and Intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

II. Intelligent Computer Program Debugger

As used herein, a bug is defined as an error or defect in computer software or computer hardware that causes a computer software program to malfunction. As used herein, a debugger is a special software program used to find bugs in other software programs. A debugger allows a developer to pause the software program execution at any point and examine the values of variables. As used herein, a breakpoint is defined as a location in computer program code, that when reached by the debugger, triggers a temporary halt in the execution of the computer program code. Computer software developer (herein also referred to as users or programmers, interchangeably) use breakpoints to test and debug software programs by causing the software program to stop at scheduled intervals so that the status of the software program can be examined in stages.

Keeping in mind the brief descriptions to Java and J2EE, reference is made to FIG. 1A depicting an exemplary user-developed application 102 being debugged by a debugger of the present invention, in accordance with one embodiment of the present invention. Application servers 104 and a web server 106 are shown to be running on top of JVM 108, directly. User-developed applications 1-3 102 are configured to run on top of the application server 104. In one exemplary embodiment, the user-developed applications 102 are Enterprise applications. For instance, Enterprise applications 102 do not have the capability to run on top of the JVM 108, directly. As a result, the Enterprise applications 102 are run on top of application servers 104, which in turn, run on top of the JVM 108. To debug the Enterprise applications 102, the application server 104 and the Enterprise applications 102 are treated as a single Java application 110, as both, Enterprise applications 102 and the application servers 104 are based on Java. In the illustrated embodiment, the Enterprise application 1 102 together with the application server 104 form the single Java application 110 while the Enterprise application 2 102 in conjunction with the application server 104 form the single Java application 112. Additional information with respect to debugging Enterprise application program code by filtering-in Enterprise application methods and classes are provided below with respect to FIGS. 2A-3D.

In one example, the J2EE application sources (i.e., the J2EE application) are compiled by the Java compiler generating a first set of byte codes. In one implementation, the J2EE application 102 being compiled can include Java files, Extensible Markup Language (XML) pages, and Java Server Pages (JSP) pages. Thereafter, the first group of byte codes is processed by a post processor (e.g., an EJB compiler, a remote method invocation (RMI) compiler, a JSP compiler, etc.) generating Java files, which in one embodiment, include stubs and skeletons. The generated Java files are then compiled by the Java compiler generating a second group of byte codes, herein referred to as the tool-generated computer program code. At this point, first and second groups of byte codes are put together, generating a packaged J2EE application in binaries.

Figure 1B:
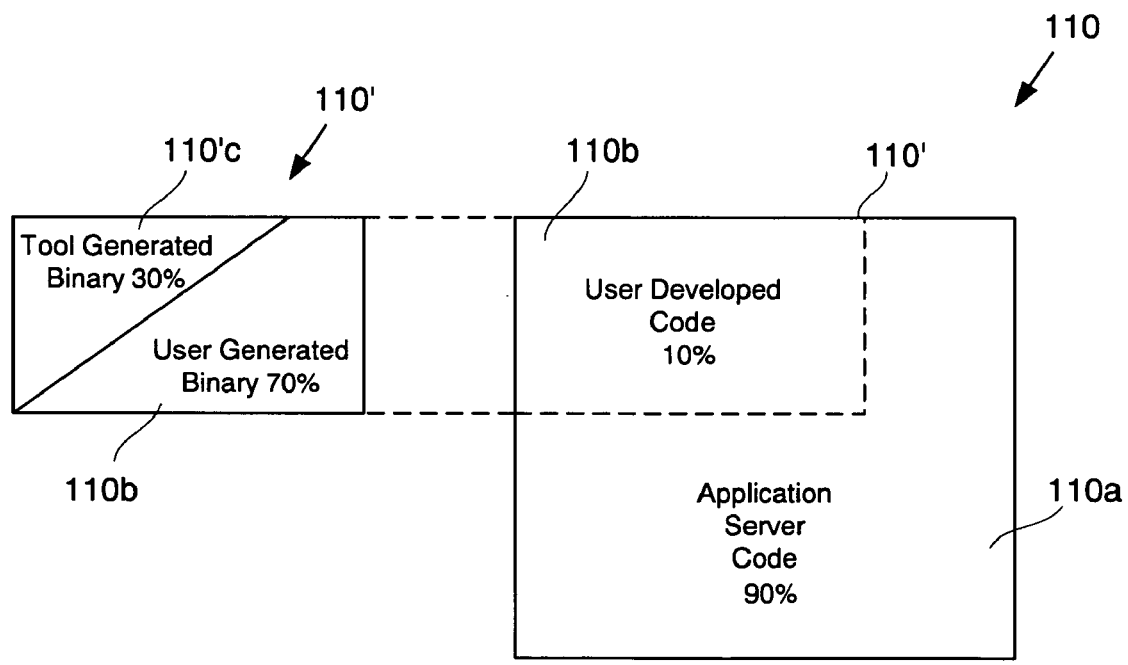
FIG. 1B shows exemplary fractions of the single Java application occupied by the Enterprise application and the application server, in accordance with one embodiment of the present invention.

Reference is made to a simplified diagram shown in FIG. 1B illustrating exemplary fractions of the single Java application 110 occupied by the Enterprise application and the application server, in accordance with one embodiment of the present invention. By way of example, the application server computer program code (herein referred to as application server code, interchangeably) is shown to have occupied about ninety percent (90%) of the single Java application code 110, while the user-developed code occupies about ten percent (10%) of the same. The diagram further depicts the fractions the user-developed application binaries 110b and the tool-generated binaries 110c occupy in the 10% portion 110' of the single Java application code 110. Specifically, the user-developed application binaries occupy about seventy percent (70%) of the remaining ten percent (10%) 110' of the single Java code while the tool-generated binaries 110c occupy about thirty percent (30%) of the remaining ten percent. As can be appreciated, the J2EE debugger of the present invention enables the Enterprise application user to debug the user-developed binaries 110b (i.e., the seventy percent of the remaining 10% 110'), whereas with the Java debugger, the user has to monitor and review each line of code being executed in the single Java code 110. Thus, in one aspect of the present invention, debugging the Enterprise applications using the J2EE debugger of present invention is more efficient, consumes less resources, and substantially limits the user's effort in monitoring and reviewing variable values and execution status of the Enterprise application.

Figure 2A:
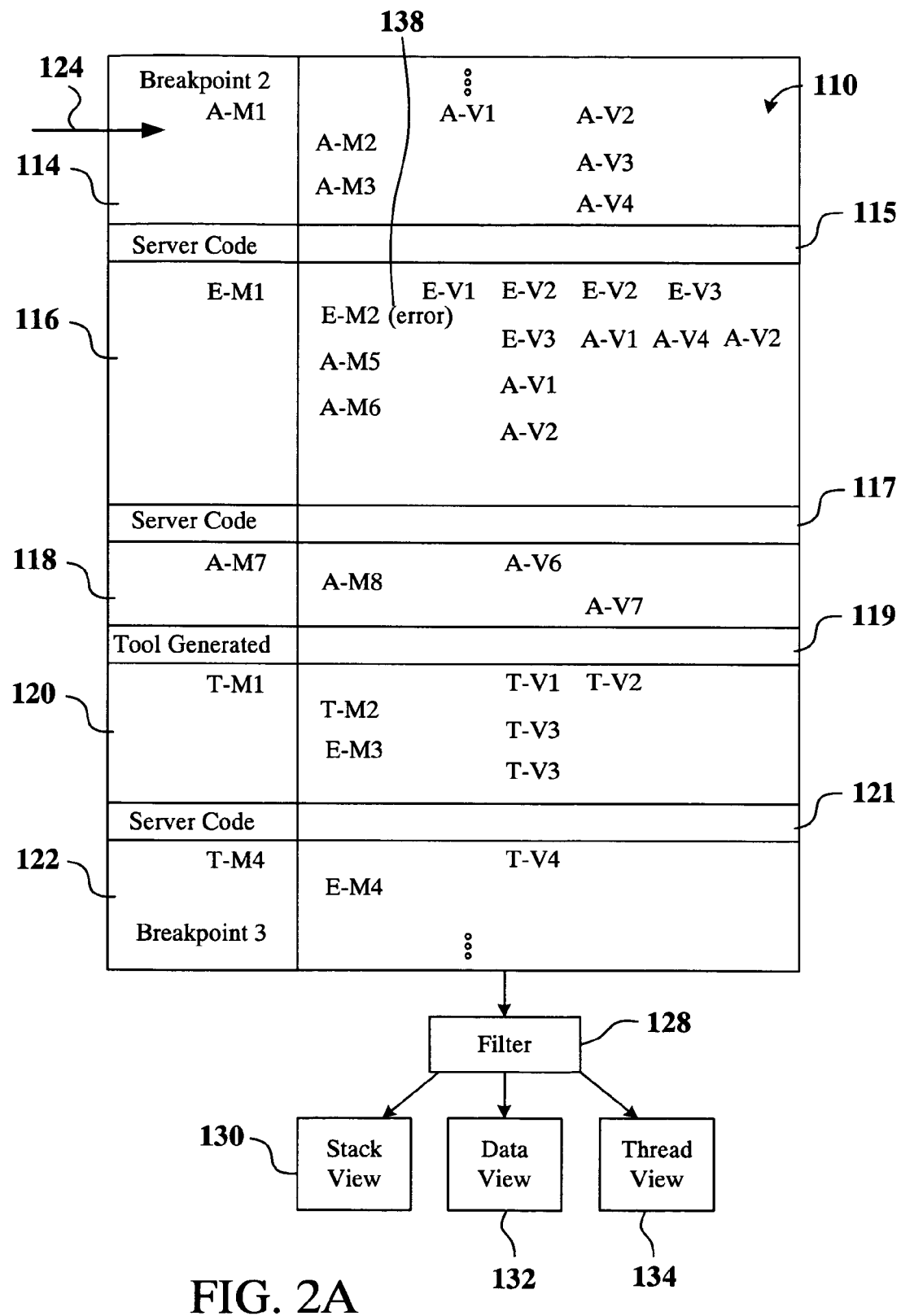
FIG. 2A is a simplified block diagram showing the capability of the J2EE debugger of the present invention to solely display user-developed data, in accordance with one embodiment of the present invention.

FIG. 2A is a simplified block diagram showing the capability of the J2EE debugger of the present invention to solely display user-developed data, in accordance with one embodiment of the present invention. A portion of the code for the single Java application 110 depicted in FIG. 1, defined between a breakpoint 2 and a breakpoint 3, is shown. A plurality of methods, each method having respective statements, methods, and variables are defined between the breakpoint 2 and breakpoint 3. In the illustrated example, 114 through 122 represent the lines of code defined between breakpoints 2 and 3. In accordance with one embodiment of the present invention, with lines 114, 116, 118, 120, and 122 being user-defined code, 115, 117, 121 being server code, and line 119 being a tool-generated line of code. In the illustrated embodiment, the J2EE debugger of the present invention steps through user-defined program code lines 114, 116, 118, 120, and 121. In one exemplary embodiment, when executing the single java application 110, an improper behavior is observed by the user. To discover the source and location of the bug, the Enterprise application 102 is debugged using the J2EE debugger of the present invention. At this point, the user sets up breakpoints at desired points in the single Java program code, as illustrated by breakpoints 2 and 3. In this manner, the J2EE debugger pauses execution once the breakpoint 2 is reached, enabling the user to monitor the execution path and state of the Enterprise application as well as variable values at the breakpoint 2. For instance, the breakpoints 2 and 3 can be stop breakpoints capable of stopping at a particular line of the single Java application source code, including a method, exception, class, variable, or thread. In one example, each breakpoint is defined at a desired line of the single Java application code such that the debugging operation stops once the desired line is reached. At this point, the single Java program code can be stepped through one source line at a time, enabling the user to compare the state of the program with an expected state.

The execution path of the J2EE application 110 includes traversing through calls by application server code, tool-generated code, and Enterprise application code. However, the J2EE debugger of the present invention has the capability to filter-in and display only paths and variables associated with the Enterprise application. In this manner, the user need not examine every call in the path, as performed in the prior art.

In the illustrated embodiment, execution of the single Java application 110 starts with the application server method A-M1, as pointed out by the arrow 124. Thereafter, executing the application 110 continues with executing an Enterprise application method E-M1 followed by a server application method A-M7. Executing the single Java application proceeds by a tool-generated T-M1 followed by another tool-generated method T-M4.

As illustrated, the application server method A-M1 has application variables A-V1 and A-V2 and calls application methods A-M2 and A-M3. The application method A-M2 calls an application method A-M3 that includes application variables A-V3 and A-V4. The Enterprise application method E-M1 includes Enterprise application variables E-V1, E-V2, and E-V3 and calls Enterprise application method E-M2 and application server methods A-M5 and A-M6. Enterprise application method E-M2 includes Enterprise application variable E-V3 and application server variables A-V1, A-V4, and A-V2. The application method A-M5 includes application server variable A-V2, and the application server method A-M6 includes an application server variable A-V2. The next application method A-M7 118 includes an application server variable A-V6 and calls an application method A-M8 that, in turn, includes an application variable A-V7. The tool-generated method T-M1 has tool-generated variables T-V1 and T-V2 and calls a tool-generated method T-M2 and an Enterprise application method E-M3 which, in turn, has a tool-generated variable T-V3. The tool-generated method T-M2 includes a tool-generated variable T-V3. The tool-generated method T-M4 122 includes a tool-generated variable T-V4 and calls an Enterprise application method E-M4 that, in turn, includes an Enterprise application variable E-V5.

However, the debugger of the present invention filters single Java application code using a filter 128. At this point, Enterprise application classes and methods are filtered-in and displayed in the debugger stack view 130, data view 132, and thread view 134. The individual tool-generated and server application generated data, methods, and classes are marked with a unique identifier and collapsed. In this manner, when stepping through between breakpoints 2 and 3, the J2EE debugger only steps through user-defined code lines 114, 116, 118, 120, and 122, and the J2EE debugger examines only the data and variables of the Enterprise application, and skips examining the non-user-defined methods and classes (e.g., application server code, tool-generated code, etc.). Additional information about the capability of the J2EE debugger to filter-in user-defined methods and classes to be displayed in the stack view, data view, and/or thread view are provided below with respect to FIGS. 2B-3D.

Figure 2B:
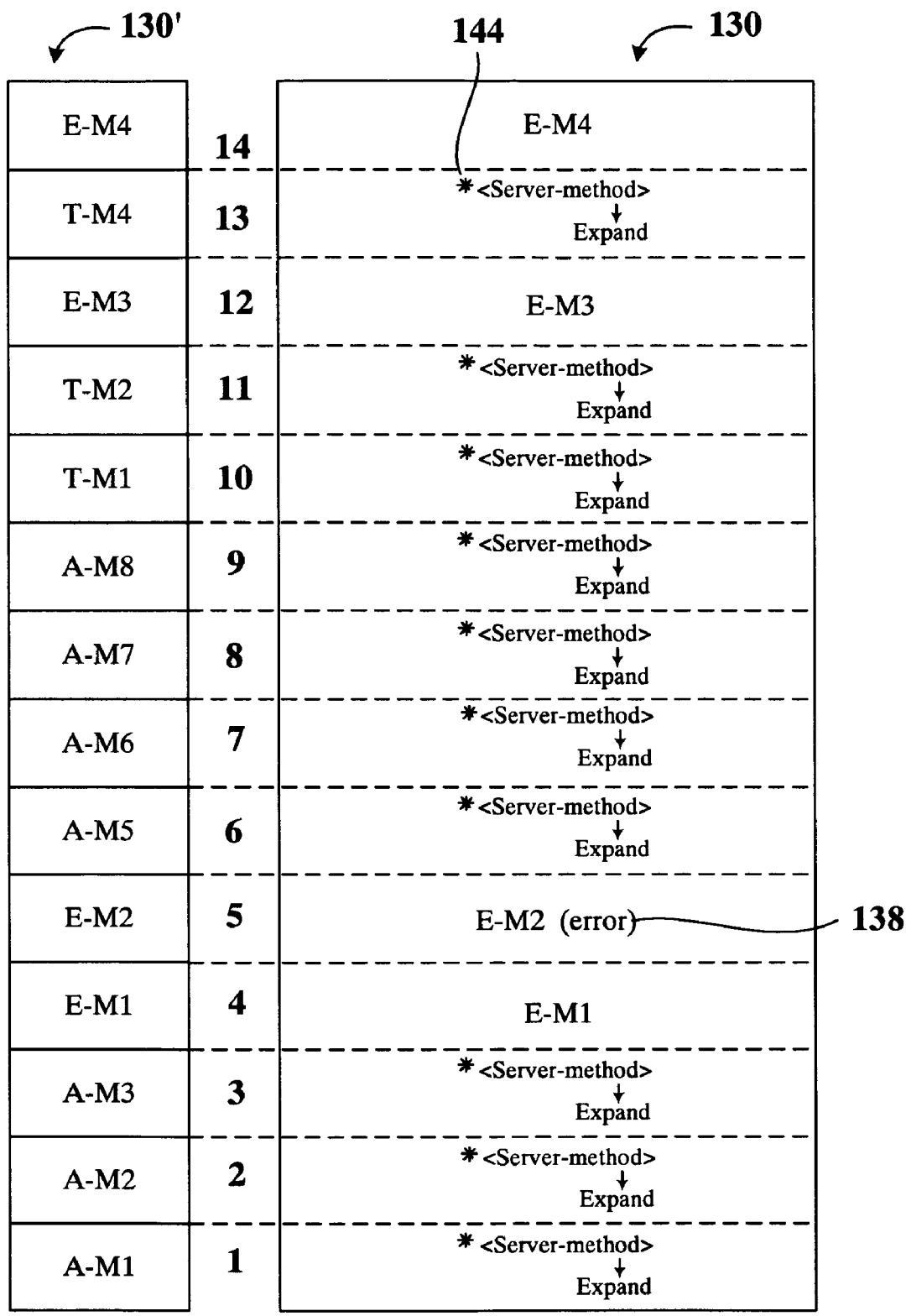
FIG. 2B shows an exemplary Java debugger stack view and the corresponding debugger stack view code defined between two breakpoints illustrated in FIG. 2A, in accordance with one embodiment of the present invention.

Proceeding to FIG. 2B, an exemplary Java debugger stack view 130' and the corresponding J2EE debugger stack view 130 of code defined between breakpoints 2 and 3 illustrated in FIG. 2A are shown, in accordance with one embodiment of the present invention. The Java stack view 130 includes currently active methods listed in the order being called. As illustrated, the Enterprise application method E-M4 has been called last while the application server method A-M1 has been called first. Application server method A-M2, application server method A-M3, Enterprise application method E-M1, Enterprise application method E-M2, application server method A-M5, application server method A-M6, application server method A-M7, application server method A-M8, tool-generated method T-M1, tool-generated method T-M2, and Enterprise application method E-m3 have been called in the order presented (i.e., second through the thirteenth).

The first method executed is the first method called (i.e., application server method A-M1) defined at the bottom of the stack, while the last method called (i.e., Enterprise application method E-M4) is defined at the top of the stack. In the illustrated embodiment, when using the Java debugger, the developer has to examine and monitor the state of execution of all the Enterprise application methods, the tool-generated methods, and the application server methods, as the Java debugger steps through each line of code defined between the breakpoints 2 and 3 lines 114-122.

However, when debugging the code for single Java application 110 using the J2EE debugger of present invention, the user merely needs to examine and monitor the status of the Enterprise application methods E-M4, E-M3, and E-M2 so as to locate the error 138 defined in the method E-M2, as the J2EE debugger only steps through the user-defined code, one line at a time, until the error 138 is located. That is, the J2EE debugger only steps through the code line 114 and 116, and not the server code line 115 defined between the lines 114 and 116. As can be seen, the J2EE stack view 130 displays the Enterprise application methods E-M4, E-M3, E-M2, and E-M1 while all the server application methods and tool-generated methods have been displayed as <server-method>, and are marked by the unique identifier "*" 144. Of course, the J2EE debugger of the present invention allows the user to expand any of the collapsed methods so that the application server methods and tool-generated methods can be displayed, if the developer chooses to do so. Thus, the J2EE debugger of the present invention allows the user to view and examine data associated with the four Enterprise application methods and skip examining the remaining collapsed tool-generated and application server methods (i.e., the remaining ten methods, all together) while the J2EE debugger only steps through the user-defined code, thus substantially expediting and simplifying debugging of Enterprise applications.

Figure 2C:
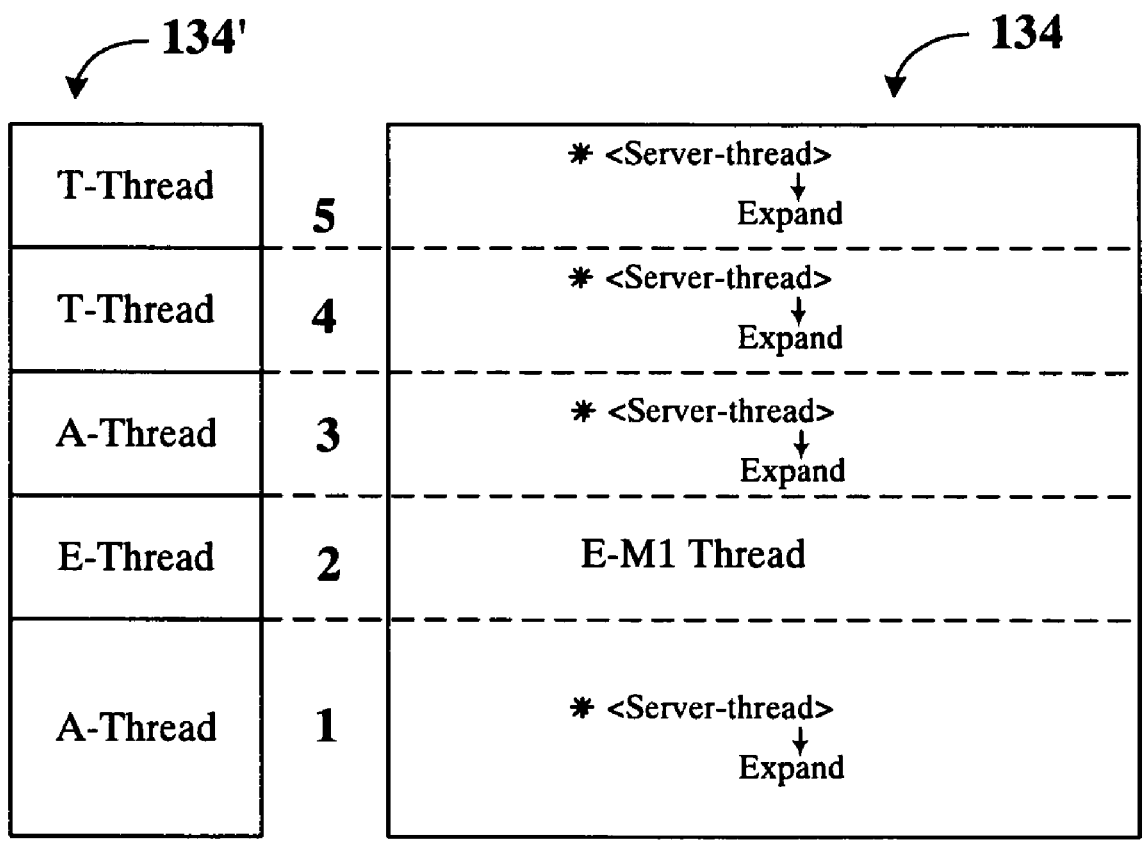
FIG. 2C shows an exemplary partial Java thread view and the corresponding J2EE thread view of the single Java file depicted in FIG. 2A, in accordance with one embodiment of the present invention.

Reference is made to the simplified block diagram of an exemplary partial Java thread view 134' and the corresponding J2EE thread view 134 of the single Java file 110 depicted in FIG. 2C, in accordance with one embodiment of the present invention. Although not shown, the treads view 134' displays the current status of all thread groups in the single Java program 110. Enterprise applications can run if called by another entity. As such, the Enterprise application threads are not usually kicked off until the Enterprise application is accessed by a user. Yet further, in one example, multiple Enterprise applications may run on the application server at any given time. In such a scenario, the threads view 134' also includes threads associated with other Enterprise applications. Furthermore, the application server can use a plurality of internal threads for bookkeeping.

The Java thread view 134' shows a group of threads that includes server application threads, tool-generated threads, and Enterprise application threads. In the illustrated embodiment, the thread group includes two server applications threads, two tool-generated threads, and only one Enterprise application thread. With the Java debugger, the user has to examine and determine status at each thread, even the non-Enterprise application threads.

Comparatively, the J2EE debugger of the present invention has the capability to display the threads view 134 wherein the Enterprise application threads are filtered and displayed. The remaining threads, however, are collapsed as <server-thread> and are marked as such using the unique identifier "*" 144. If the developer chooses, the J2EE debugger of the present invention allows the user to expand on each of the non-user-defined threads. Furthermore, the J2EE debugger of the present invention solely steps through the computer code for the Enterprise application (e.g., lines 114, 116, 118, 120, and 122). In this manner, data associated with the other application threads and system threads are not displayed, simplifying the debugging operation.

Figure 2D:
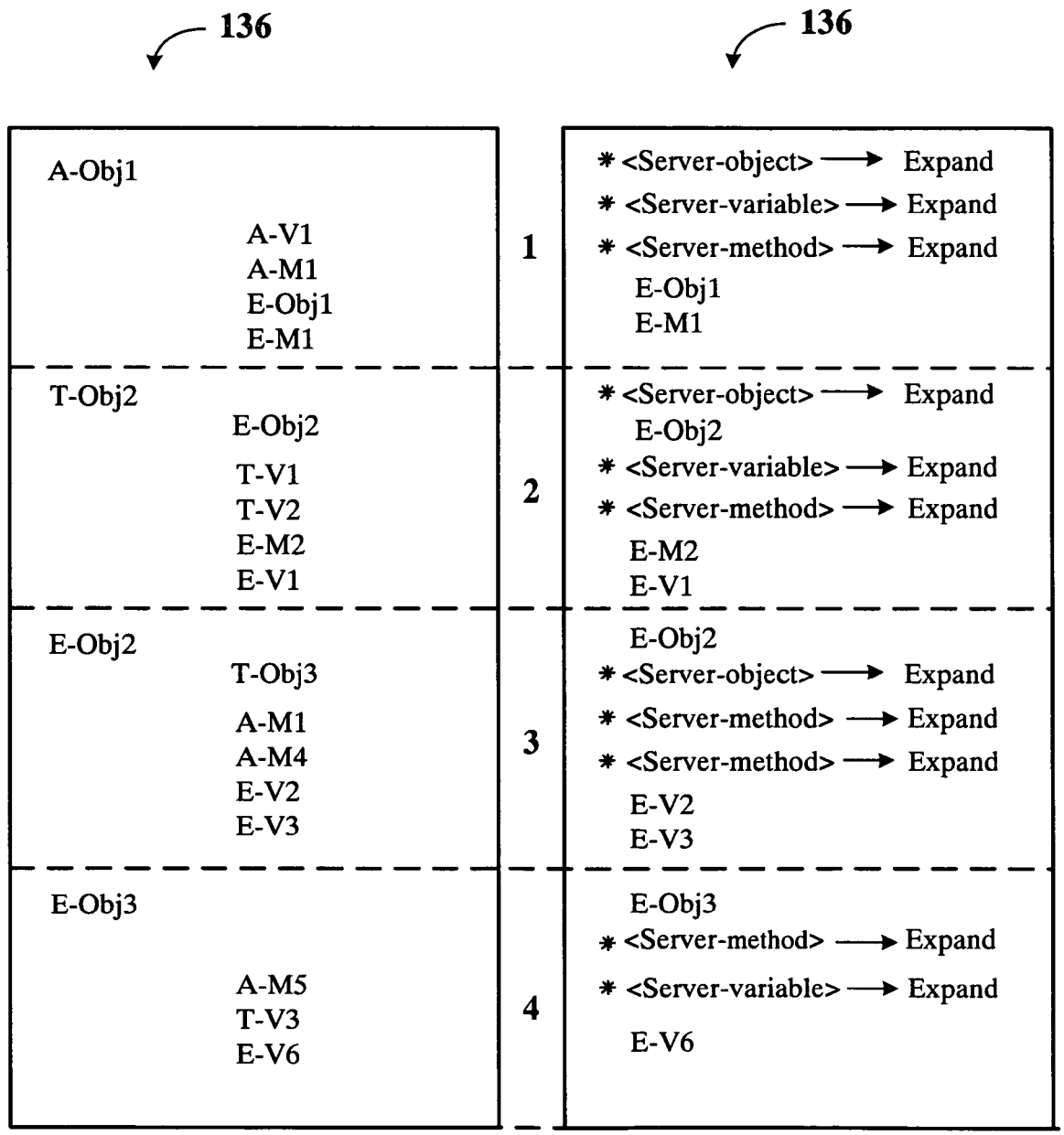
FIG. 2D illustrates an exemplary Java data view and the corresponding J2EE data view of the partial code of single Java program, in accordance with one embodiment of the present invention.

FIG. 2D shows an exemplary Java data view 136' and the corresponding J2EE data view 136 of the partial code of single Java program 110, in accordance with one embodiment of the present invention. The Java data view 136' includes application server object A-obj1, tool-generated object T-obj2, and Enterprise application objects E-Obj2 and E-Obj3, as shown in rows 1-4, respectively. The application server object A-obj1 includes application sever variable A-V1, application server method A-M1, Enterprise application object. E-Obj1, and Enterprise application method E-M1. When using the Java debugger, the developer is required to examine variables and methods associated with Enterprise application objects as well as the application server objects and tool-generated objects. The J2EE debugger of the present invention, however, only filters in Enterprise application fields and objects. As illustrated in the J2EE debugger view 136, application server object A-obj1 is collapsed and displayed as a <server-object> and is marked by the unique identifier "*" 144. Similarly, server application variable A-V1 and server application method A-M1 are marked by the unique identifier 144, collapsed, and displayed as <server-variable> and <server-method>, respectively. However, the J2EE data view 136 only displays data associated with the Enterprise application object E-Obj1 as well an Enterprise application method E-M1.

In the same manner, the J2EE data view of the tool-generated object obj-2 is collapsed as <server-object> and marked by the unique identifier 144 as well as each of the tool-generated variables T-V1 and T-V2. Comparatively, the values of the Enterprise application object E-Obj2 as well as Enterprise application method E-M2 and Enterprise application variable E-V1 are displayed, as shown in row 2 of the J2EE data view 136. The Enterprise application object E-Obj2 is shown to include a method and a variable associated with the Enterprise application (Enterprise application variable E-V2 and E-V3) the value of each is displayed in the corresponding row in the J2EE data view 136. The illustrated Enterprise application object 2 also includes the tool-generated object T-obj3 as well as application server methods A-M1, A-M4, which are collapsed as <server-object> and <server-method> and are marked by the unique identifier 144.

Lastly, while the values of Enterprise application object E-Obj3 and Enterprise application variable E-V6 are displayed in both the Java and the J2EE data views 136' and 136, the application server method A-M5 and the tool-generated variable T-V3 are collapsed and displayed as <server-method> and <server-field> and marked by the unique identifier 144, with the J2EE debugger only stepping through user-defined code.

Figure 3A:
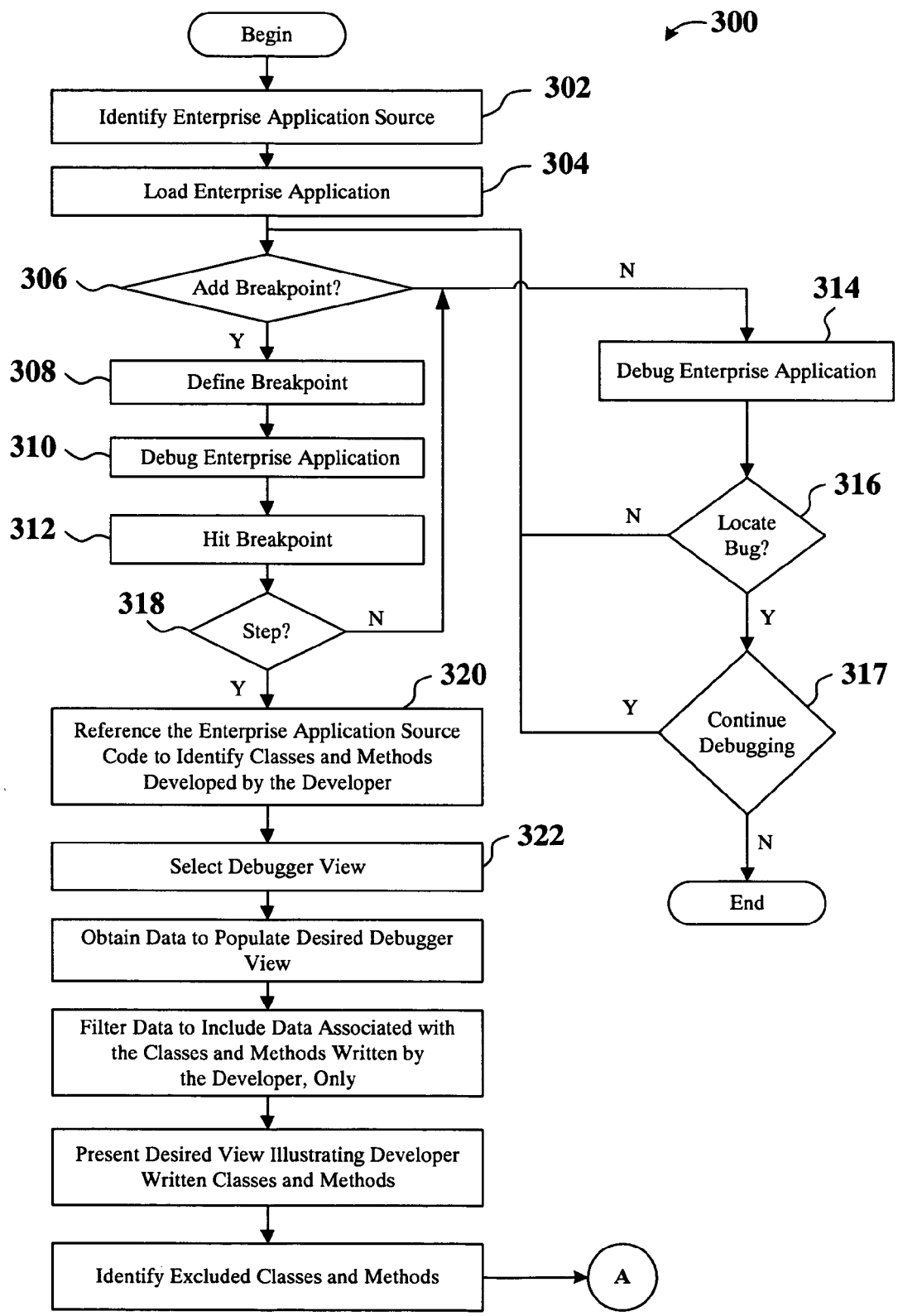
FIG. 3A depicts a flowchart diagram of method operations performed by an exemplary J2EE debugger, in accordance with yet another embodiment of the present invention.
Figure 3B:
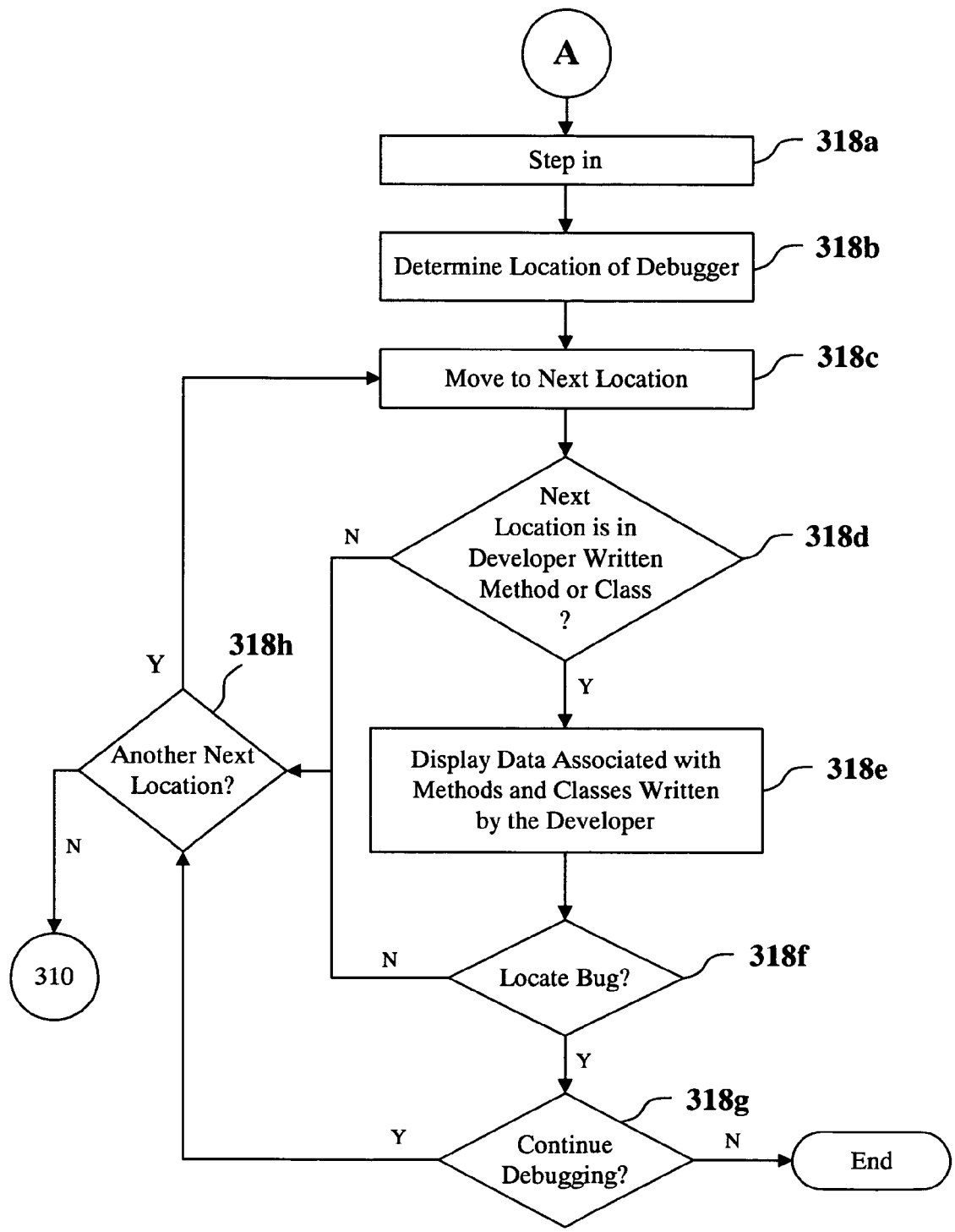
FIG. 3B depicts a flowchart diagram of method operations performed to step through the packaged application so as to display only data associated with the user-defined classes and methods in the Enterprise application, in accordance with yet another embodiment of the present invention.
Figure 3C:
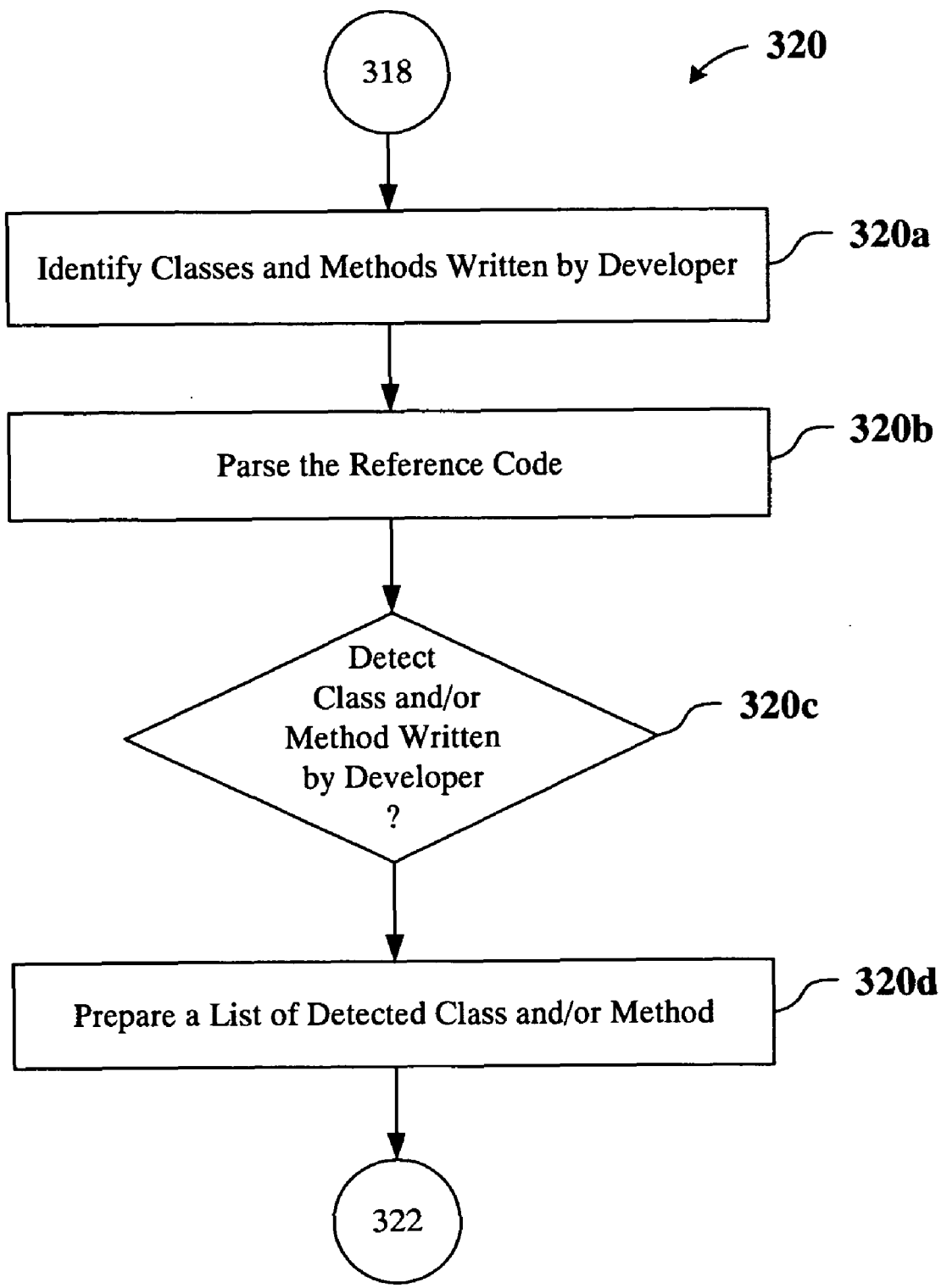
FIG. 3C depicts a flowchart diagram of method operations performed to reference the methods and classes of the Enterprise application source code, in accordance with yet another embodiment of the present invention.
Figure 3D:
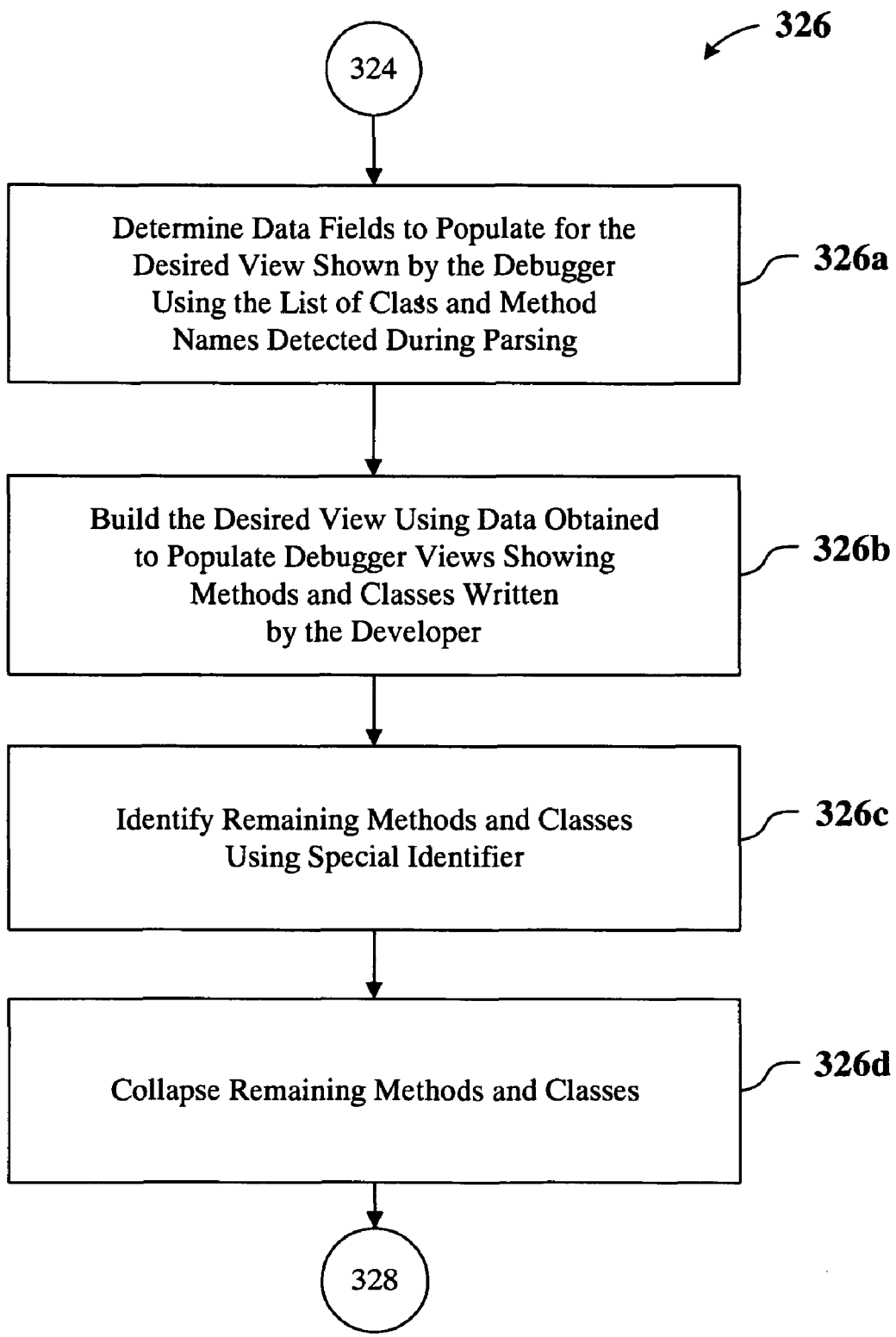
FIG. 3D depicts a flowchart diagram of method operations performed to filter-in only data associated with the classes and method written by the developer, in accordance with yet another embodiment of the present invention.

It must be appreciated by one of ordinary skill in the art that although in the exemplary embodiment shown in FIGS. 3B-3D the unique identifier is the "*," in another embodiment, any unique symbol or mark can be used to identify the non-user defined artifacts or instructions. Furthermore, although in the illustrated embodiment the non-user defined artifacts and instructions are collapsed as "<server-method>, <tool-generated-method>, etc., in a different embodiment, the non-user-defined artifacts and instructions can be collapsed using any distinguishing word or phrase.

Accordingly, as illustrated in the exemplary views in FIGS. 2B-2D, in one embodiment, the J2EE debugger of the present invention merely displays data associated with the Enterprise application objects, methods, variables, and threads, thus enabling the developer to only monitor the status of the Enterprise application classes and method.

Proceeding to a flowchart diagram 300 depicted in FIG. 3A, method operations performed by an exemplary J2EE debugger is shown, in accordance with one embodiment of the present invention. The method starts in operation 302 in which the developer identifies Enterprise application sources to be debugged followed by the operation 304 wherein the Enterprise application is loaded into the J2EE debugger. In one example, the J2EE application sources are compiled by the Java compiler generating a first group of byte codes, which in one example can include Java files, XML pages, JSP pages, etc.

At this point, in operation 306, a decision is made by the developer as to whether to define any breakpoints in the packaged application (e.g., the single Java program 110 depicted in FIG. 2A. If the developer chooses to debug the Enterprise application without defining a breakpoint, the method continues to operation 314 wherein the Enterprise application is debugged. In operation 316, a decision is made as to whether an improper behavior or a bug was detected during debugging of the Enterprise application. If a bug has not been detected, the method continues to operation 306 wherein breakpoints are added. If, however, a bug has been detected, the method proceeds to operation 317 wherein a decision is made as to whether debugging the Enterprise application should be continued. If the developer chooses to continue the debugging operation, the method continues to operation 306.

If a bug is detected in the operation 316 or the developer decides to define a breakpoint in the packaged application in the operation 306, the method continues to operation 308 wherein a breakpoint is defined in the packaged application. Debugging the Enterprise application is initiated in operation 310 so that the location of the bug can be determined as the J2EE debugger, the Enterprise application, and the application server are being executed. The debugging operation continues until a breakpoint is hit in operation 312. At this point, in operation 318, a determination is made as to whether the debugging operation should continue with the debugger stepping through lines of code or methods in the packaged application. If the developer selects to step through the lines of code in the packaged application, the method continues to operation 320. In one example, the developer can become aware that the J2EE debugger has bypassed all of the defined breakpoints, and yet, the bug or the source of the bug has not been determined. In such a scenario, the developer may decide to step through the remaining lines of code to locate the bug. In the event the developer selects not to step through the code in operation 318, the method continues to operation 314 wherein debugging the Enterprise application is continued.

In the alternative, in operation 320, the method continues to reference the Enterprise application source code so as to identify classes and methods in the Enterprise application written by the developer. Thereafter, the method continues to operation 322 in which the developer selects the debugger view to be displayed. Although, in a different embodiment, a need does not exist to choose a view, and as such, the debugger can provide data for all views. Next, in operation 324, data required to populate the desired debugger view is obtained. Such data includes data associated with all the methods and classes defined in the application server, tool-generated code, and the Enterprise application. In operation 326, the J2EE debugger filters in only data associated with the Enterprise application classes and methods identified in the operation 320. Proceeding to operation 328, only data associated with the identified Enterprise application classes and methods and respective values at the breakpoint are displayed in the selected view. Then, in operation 330, non-user-defined classes and methods (i.e., application server, tool-generated, etc.) are identified and marked by a unique identifier and are collapsed in the selected view. Once only the developer defined methods and classes are displayed in the selected view, the method proceeds to operation 318 so as to step through developer-defined methods and classes.

Proceeding to the flowchart diagram depicted in FIG. 3B, method operations performed to step through the packaged application so as to display only data associated with the user-defined classes and methods in the Enterprise application is provided, in accordance with one embodiment of the present invention. In operation 318a, the method steps into the code to be debugged which may or may not be a user-defined code, followed by the operation 318b wherein the location of the debugger is determined. In operation 318c, the debugger moves to the next location (i.e., next line of code in the packaged application to be executed). At this point, in operation 318d, a determination is made as to whether the next location to be executed is a developer-written line of code (e.g., includes a reference to developer-written artifacts such as a method or a class, etc.). If the next location is not a developer-written line of code, the method continues to operation 318h wherein a determination is made as to whether another next location exists (i.e., additional lines of code to be executed through stepping). If another location does not exist, the method continues to operation 310. Otherwise, the method continues to operation 318c, wherein the debugger moves to the next location.

If in operation 318d a determination is made that the next location is in a user-defined line of code, the method continues to operation 318e wherein the data associated with the user-defined artifact referred to in the line of code is presented followed by the operation 318f wherein a determination is made as to whether a bug has been discovered. If a bug has not been found, the method continues to operation 318h so as to continue with the debugging operation. However, if a bug has been located, the method continues to operation 318g wherein a determination is made as to whether the developer chooses to continue with the debugging operation. In one example, the debugging operation maybe continued to confirm that all existing bugs have been detected and eliminated. If the developer selects to continue with the debugging operation, the method continues to operation 318h.

In one exemplary embodiment, as each line of user-developed code stepped through and executed, values associated with the artifacts are updated, if necessary. At any given step, the developer can compare the actual state of the user-defined artifacts (e.g., variable or method, etc.) displayed in the selected view, with the expected value of the variable, so that the location or the source of the bug can be determined.

Proceeding to the flowchart diagram depicted in FIG. 3C, method operations performed to reference the artifacts (e.g., methods and classes) of the Enterprise application source code are provided, in accordance with one embodiment of the present invention. In operation 320a, classes and methods written by the developer are identified followed by the operation 320b wherein the referenced code (i.e., the developer-written code) is parsed. For instance, the J2EE debugger searches through the packaged application to discover and identify each and every class and method developed by the user. Thereafter, in operation 320d, a list of classes and methods detected in the operation 320c is made. By way of example, in operation 320b, the debugger looks for the names of the methods and classes identified in operation 320a, and prepares the list of the names of the methods and classes in operation 320d. The method then continues to operation 322.

In one exemplary embodiment, the Enterprise application classes and methods discovered and identified in operation 320a can be cached and used in subsequent operations. Of course, one of ordinary skill in the art must appreciate that the artifacts defined in the Enterprise application maybe modified. In such a scenario, operations 320a-320d are repeated so that the list includes most updated data. At such point, the artifacts identified and parsed can be re-cached and used when needed.

FIG. 3D depicts a flowchart diagram of method operations performed to filter-in only data associated with the classes and method written by the developer, in accordance with one embodiment of the present invention. In operation 326a, the debugger uses the list of artifact (e.g., classes and method) names detected during the parsing operation to determine data fields to be populated in the selected view. Proceeding to operation 326b, data obtained to populate the desired debugger view is implemented to build the desired view, only showing data associated with methods and classes written by the developer. Remaining methods and classes (e.g., serve or tool-generated methods and classes, etc.) are identified by being marked, using the unique identifier, and collapsed in operations 326c and 326d, respectively. The method then continues to operation 326d.

It must be appreciated by one of ordinary skill in the art that classes and methods associated with the computer software code developed by the user can be filtered-in and displayed by any debugger so long as the debugger has filtering capability. Furthermore, one of ordinary skill in the art should appreciate that the debugger of the present invention can be applied in any computer system configuration (e.g., hand-held devices, microprocessor systems, microprocessor-based or programmable consumer electronics, minicomputers, mainframe computers, etc.) and device (e.g., embedded mobile devices (e.g., a PDA, a mobile phone, etc.), etc.) Still further, it must be noted that in the present invention, data associated with the user-defined application can be stored to any appropriate device data storage (e.g., memory, random access memory (RAM), flash memory, hard disc, mini hard disc, etc.).

The aspects of the present invention are numerous. Most importantly, in contrast to the prior art, debugging the user-defined applications using the debugger of present invention is more efficient, consumes less resources, and substantially reduces the user's effort in monitoring and reviewing variable values and the execution status of the user-defined application. Furthermore, the debugger of the present invention is capable of merely displaying data and methods associated with the user-defined application (e.g., objects, methods, variables, and threads, etc.), while cloaking non-user-defined data and methods, thus enabling expeditious debugging of the user-defined applications. Furthermore, the J2EE debugger of the present invention facilitates stepping through only user-defined program code, thus bypassing non-user-defined parts of the Enterprise application.

Although specific reference is made to terminology defined by Sun Microsystems, Inc., it should be understood that any name could be used for such terms, so long as the desired functionality is achieved. Additionally, the embodiments of the present invention can be implemented in any computer system configurations including hand-held devices, microprocessor systems, microprocessor-based or programmable consumer electronics, minicomputers, mainframe computers and the like. The operating system can support any communication protocol, including protocols for downloading application files. Furthermore, the computer system can run on any operating system. Accordingly, any reference to a particular standard should be viewed only as exemplary and focus should be placed on the claimed functional operation.

It should further be understood that, the invention might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Furthermore, any of the operations described herein that form part of the invention are useful machine operations. The invention also relates to a device or an apparatus for performing these operations. The apparatus may be specially constructed for the required purposes, or it may be a general-purpose computer selectively activated or configured by a computer program stored in the computer. In particular, various general-purpose machines may be used with computer programs written in accordance with the teachings herein, or it may be more convenient to construct a more specialized apparatus to perform the required operations.

Yet further, the invention can also be embodied as computer readable code on a computer readable medium. The computer readable medium is any data storage device that can store data which thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion. Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for displaying a user-defined artifact in a debugger view, the user-defined artifact being defined in a software application developed by a computer software application developer, the software application being included in a packaged application, the packaged application configured to include instructions configured to be one of a user-defined instruction and a non-user defined instruction, a breakpoint having been defined at a desired instruction of the packaged application, the method comprising:
    initiating debugging of the packaged application;
    hitting the breakpoint defined at the desired instruction;
    identifying the user-defined artifact in the software application;
    obtaining data to populate the debugger view;
    filtering-in data associated with the user-defined artifact;
    displaying the debugger view showing the filtered-in data;
    marking data not associated with the user-defined artifact after the filtering; and
    stepping through the user-defined instruction after the marking, while skipping the data not associated with the user defined artifact, wherein each method operation is executed by a processor.

2. A method as recited in claim 1, wherein the operation of identifying the user-defined artifact in the software application includes,
    parsing the software application to detect the user-defined artifact; and
    preparing a list of the user-defined artifact.

3. A method as recited in claim 2, wherein the operation of obtaining data to populate the debugger view includes,
    determining a data field to be populated for the debugger view.

4. A method as recited in claim 3, wherein the operation of filtering-in data associated with the user-defined artifact includes,
    using the list of user-defined artifact to determine the data field to be populated for the debugger view; and
    building the debugger view by populating the data field to be populated for the debugger view using data associated with the user-defined artifact.

5. A method as recited in claim 3, wherein the operation of marking data not associated with the user-defined artifact includes,
    using a unique identifier to designate a non-user defined artifact.

6. A method as recited in claim 5, further including,
    collapsing the non-user defined artifact.

7. A method as recited in claim 4, the method further comprising:
    displaying the debugger view implementing data obtained to populate the debugger view showing data associated with the user-defined artifact.

8. A method as recited in claim 6, further including expanding the
    non-user-defined artifact.

9. A method as recited in claim 1, wherein the debugger view can be one of a data view, a stack view, a thread view, a process view, and a source view.

10. A method as recited in claim 1, wherein the software application is an Enterprise application.

11. A method as recited in claim 10, wherein the software application is run by a server application running on Java™ 2 Enterprise Edition (J2EE) platform.

12. A method as recited in claim 1, wherein the user-defined artifact is one of a method, a method call sequence, a thread, a loaded class, a class method, a class field, a source code for an application, a declared data variable, and a runtime data variable.

13. A method for debugging a packaged software application including instructions configured to be one of a user-defined instruction contained in a software application developed by a software application developer and a non-user-defined instruction, a breakpoint having been defined at a desired instruction of the packaged software application, the method comprising:
    initiating debugging of the packaged software application;
    hitting the breakpoint defined at the desired instruction;
    identifying a user-defined artifact in the software application, the user-defined artifact being developed by the developer in the software application;
    filtering-in an instruction referring to the user-defined artifact;
    marking an instruction not referring to the user-defined artifact after the filtering; and
    stepping through the instruction referring to the user-defined artifact after the marking, while skipping the data not associated with the user defined artifact; and
    displaying data associated with the filtered-in instruction referring to the user-defined artifact, wherein each method operation is executed by a processor.

14. A method as recited in claim 13, wherein the operation of identifying the user-defined artifact in the software application includes,
    parsing the software application to detect the artifact defined by the developer in the software application; and
    preparing a list of the user-defined artifact.

15. A method as recited in claim 14, wherein the operation of filtering-in the instruction referring to the user-defined artifact includes,
    locating the instruction referring to the user-defined artifact using the list of the user-defined artifact; and
    identifying the instruction not referring to the user-defined artifact.

16. A method as recited in claim 13, wherein the operation of marking the instruction not referring to the user-defined artifact includes,
    identifying the instruction not referring to the user-defined artifact; and
    labeling the instruction not referring to the user-defined artifact with a unique identifier.

17. A method as recited in claim 16, the operation further including,
    collapsing the instruction not referring to the user-defined artifact.

18. A method as recited in claim 17, wherein the operation further includes,
    expanding the instruction not referring to the user-defined artifact.

19. A method as recited in claim 13, wherein the user-defined artifact is one of a method, a method call sequence, a thread, a loaded class, a class method, a class field, a source code for an application, a declared data variable, and a runtime data variable.

20. A computer program embodied on a computer readable medium for displaying a user-defined artifact in a debugger view, the user-defined artifact being defined in a software application developed by a computer software application developer, the software application being included in a packaged application, the packaged application configured to include instructions configured to be one of a user-defined instruction and a non-user defined instruction, a breakpoint having been defined at a desired instruction of the packaged application, the method comprising:

program instructions for initiating debugging of the packaged application;

program instructions for hitting the breakpoint defined at the desired instruction;

program instructions for identifying the user-defined artifact in the software application;

program instructions for obtaining data to populate the debugger view;

program instructions for filtering-in data associated with the user-defined artifact;

program instructions for displaying the debugger view showing the filtered-in data;

program instructions for marking data not associated with the user-defined artifact after the filtering; and program instructions for stepping through the user-defined instruction after the marking, while skipping the data not associated with the user defined artifact.

\* \* \* \* \*